United States Patent [19]

Irie

[11] Patent Number: 4,733,280

[45] Date of Patent: Mar. 22, 1988

[54] ORIGINAL ILLUMINATING DEVICE OF A COPYING MACHINE

[75] Inventor: Yoichiro Irie, Suita, Japan

[73] Assignee: Mita Industrial Co., Ltd., Osaka, Japan

[21] Appl. No.: 921,505

[22] Filed: Oct. 22, 1986

[30] Foreign Application Priority Data

Oct. 29, 1985 [JP] Japan ................... 60-242372

[51] Int. Cl.$^4$ ............................. G03B 27/54
[52] U.S. Cl. ....................................... 355/67
[58] Field of Search .................... 355/67, 70, 8, 11

[56] References Cited

U.S. PATENT DOCUMENTS

| 3,592,544 | 7/1971 | Brendel | 355/70 |
| 4,239,383 | 12/1980 | Peterson | 355/67 |
| 4,330,196 | 5/1982 | Yamaguchi | 355/8 |
| 4,519,702 | 5/1982 | Shigemura et al. | 355/11 X |

FOREIGN PATENT DOCUMENTS 65831 4/1984 Japan ...................... 355/67

Primary Examiner—Donald A. Griffin
Attorney, Agent, or Firm—Beveridge, DeGrandi and Weilacher

[57] ABSTRACT

A novel original illuminator of electrophotographic copying machine capable of leading the majority of light from the illuminant onto the original surface placed on the contact glass by applying the condenser mirror to allow the light not oriented to the original to reflect itself by a mirror opposite from the condenser mirror before eventually leading light to the illuminant over again.

5 Claims, 4 Drawing Figures

ORIGINAL ILLUMINATING DEVICE OF A COPYING MACHINE

BACKGROUND OF THE INVENTION

The present invention relates to a original illuminating device of a copying machine, more particularly, to original illuminating device that illuminates the original by effectively leading light from a bar-shaped illuminant.

Typically, as shown in FIG. 4, any conventional electrophotographic copying machine is provided with an illuminant 72 comprised of a halogen lamp for example at a specific position of condenser mirror 71 and also with a plane reflection mirror 73 which faces the condenser mirror 71 and the relative positions of the installed condenser mirror 71 and the plane reflection mirror 73 are correctly set to allow light to radiate the original surface 75 placed on the contact glass 74 by the predetermined incident angles being opposite from each other. Light reflected from the original 75 is then vertically led downward to allow slit 76 to cut unnecessary portions before eventually being led to the image processing unit which is not shown in FIG. 4.

When using such a original illuminating device having the constitution mentioned above, since the original 75 can be illuminated also by plane reflection mirror 73 in addition to the illumination of the original 75 by the condenser mirror 71, light emitted from the illuminant 72 can effectively be used for illuminating the original 75.

On the other hand, such a conventional copying machine usually improves performances for detaching the copied paper from both the photoreceptor drum and fixing roller by providing blank portion having a specific width at the tip end of the copied paper. Normally, white reflection part 77 is provided on the bottom surface of the contact glass 74 for generating the blank portion. As a result, when intensity of light from the plane reflection mirror 73 is strong, there is a significant difference in the amount of light radiated onto the original 75 between those conditions in which light is shut off by the reflection part 77 and light freely radiates onto the original 75, thus causing tip-shadow to be generated in the tip portion of the copied paper. Conversely, when intensity of light from the plane reflection mirror 75 is weak, in order to radiate the predetermined intensity of light onto the original 75, light volume should be increased by strengthening the magnitude of watt of the illuminant 72 itself.

SUMMARY OF THE INVENTION

The primary object of the present invention is to prevent light volume illuminating the original form diminishing itself.

Another object of the present invention is to prevent tip-shadow formation at the tip portion of the obtained copy.

The original illuminating device embodied in the present invention is comprised of a condenser mirror and an illuminant, in which the condenser mirror is provided with a specific configuration capable of effectively guiding the majority of light from the illuminant onto the original placed on the contact glass, and further comprised of a mirror faced against the condenser mirror causes light not being led to the original to reflect so that it can again be led to the illuminant.

The original illuminating device related to the present invention featuring the constitution mentioned above allows a greater part of light from the illuminant to be radiated onto the original on the contact glass concentratively by the condenser mirror, while a specific portion of the remaining light is led from the condenser mirror to the opposite mirror to allow the condenser mirror to guide light reflected from the opposite mirror to the illuminant. A significantly large part of light fed back to the illuminant reflects itself before eventually radiating itself from the condenser mirror onto the original over again.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENTS

Referring more particularly to the accompanying drawings, one of the preferred embodiments of the original illuminating device related to the present invention is described below.

Figure 3:
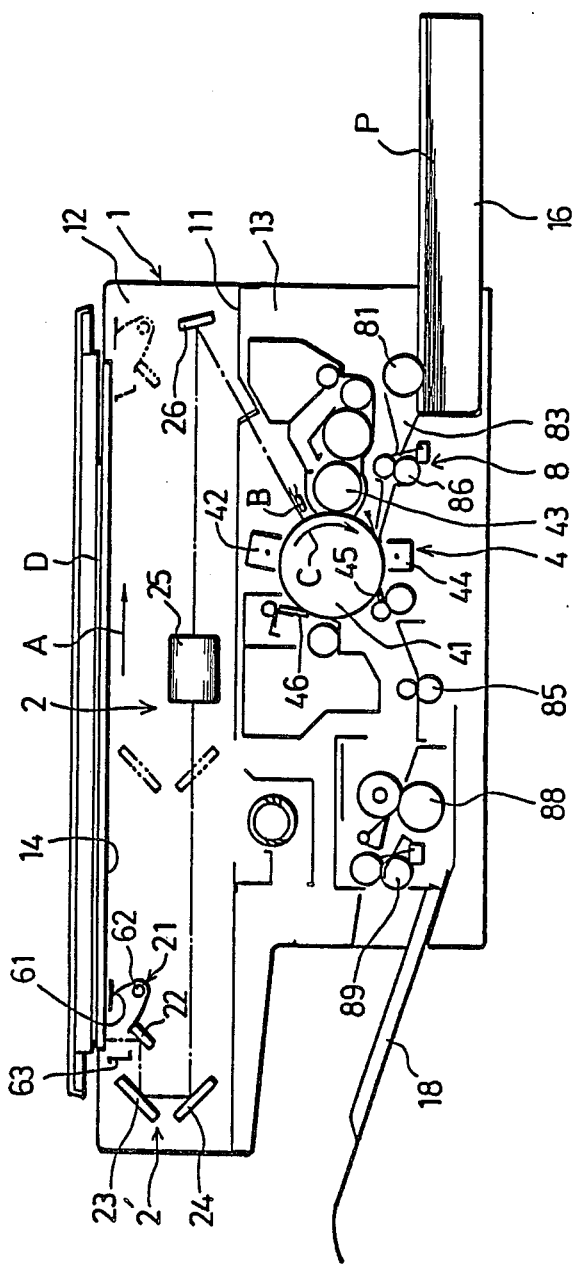
FIG. 3 is the schematic diagram denoting the internal mechanism of the copying machine incorporating the original illuminating device related to the present invention.
Figure 4:
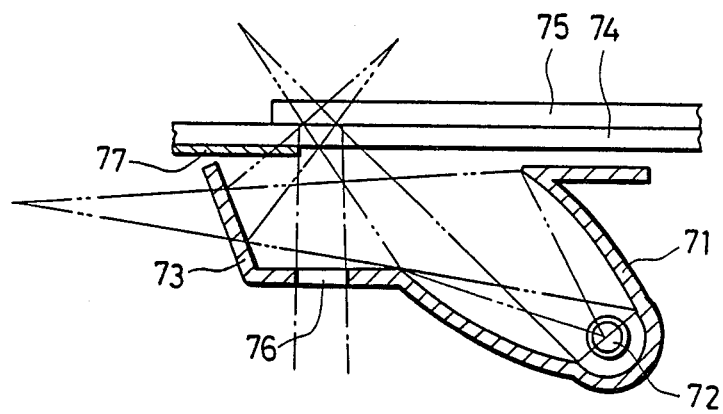
FIG. 4 is the vertical sectional view denoting the configuration of a conventional original illuminating device.

FIG. 3 is the schematic diagram denoting the internal mechanism of the copying machine incorporating the original illuminating device related to the present invention.

The electrophotographic copying machine 1 is internally divided into the upper chamber 12 and the lower chamber 13 by the partition board 11. The upper chamber 12 is provided with the optical system 2 which is used for scanning and illuminating an original D. The lower chamber 13 is provided with a copy processing unit 4 which generates copied image on a copying paper P and a copying paper conveying unit 8.

The optical system 2 is comprised of a light source 21 including a halogen lamp 62, a condenser mirror 61, and another mirror 63, a plurality of plane reflection mirrors 22 through 24, a lens 25, and a plane reflection mirror 26, while the optical system 21 scans and illuminates an original D on the contact glass 14 by causing both the light source 21 and the plane reflection mirrors 22 through 24 to move in the arrowed direction A. The light source 21 and the plane reflection mirror 22 integrally move themselves together with plane reflection mirrors 23 and 24 so that both the light source 21 and the plane reflection mirror 22 can move themselves at a speed that doubles the travelling speed of plane reflection mirrors 23 and 24. Both the light source 21 and plane reflection mirrors 22 through 24 are integrally called the optical system 2' in the following description.

The copying paper conveying unit 8 is comprised of a paper-feeding roller 81, a paper-feeding path 83, a resistant roller 86, a paper-conveying roller 85, a fixing roller 88, and a copied-paper discharging roller 89, respectively. Each copying paper P is drawn out from the paper-feeding cassette 16 by rotating the paper feeding roller 81, and then the copying paper P is delivered to the image processing unit 4 for receiving toner image corresponding to the original paper D. Toner image is then heated and fixed by the fixing roller 88 before the copied paper is eventually discharged onto the copied-paper tray 18. The preferred embodiment of the present invention doesn't however define its scope within the constitution mentioned above. For example, any of those constitutions of conventional paper-conveying unit positioned the paper-feeding part and paper-discharging part at the same side of the copying machine may also be made available. The image processing unit 4 is provided with corona charger 42, blank lamp B, developing device 43, transfer charger 44, peeling member 45 and cleaner 46, which are installed in the above order in the periphery of the photoreceptor drum 41 that rotates in the direction C shown in FIG. 3. Static latent image is first generated by causing the original image to be formed on the external surface of the photoreceptor drum 41 which is uniformly charged by the corona charger 42. Then, the blank lamp B eliminates static charge from ambient portions where no static latent image is generated. Next, the developing device 43 develops the latent image into toner image, which is then transferred onto the copying paper P by the transfer charger 44, and finally, residual toner on the photoreceptor drum 41 is collected by the cleaner 46. The preferred embodiment doesn't however define its scope within the constitution mentioned above. For example, any of those constitutions of conventional copy processing unit like the belt shaped photoreceptor may also be made available.

Figure 1:
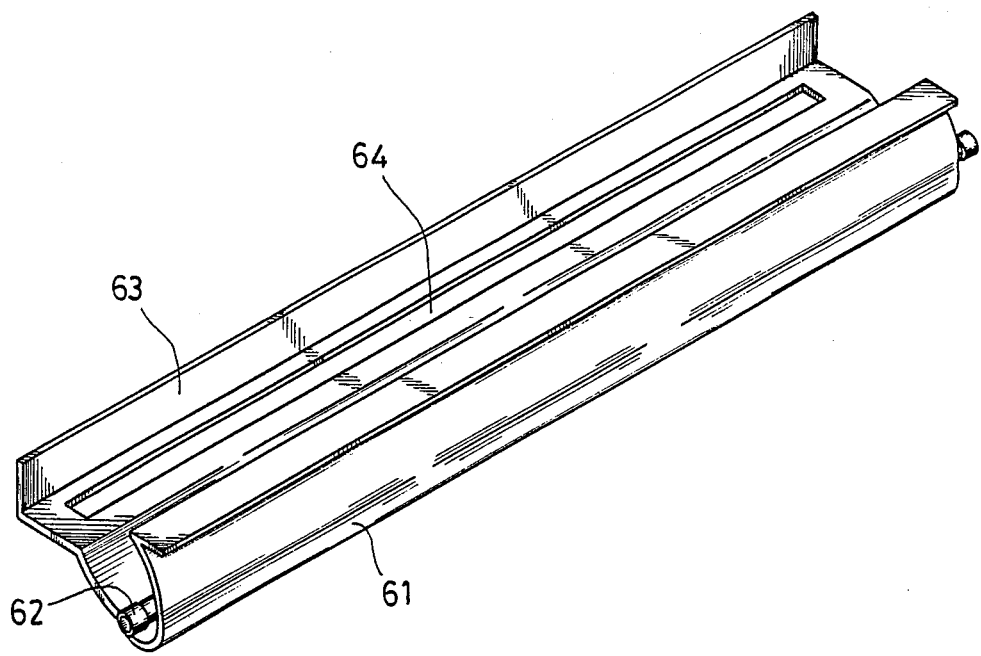
FIG. 1 is the perspective view denoting one of the preferred embodiments of the original illuminating device related to the present invention.
Figure 2:
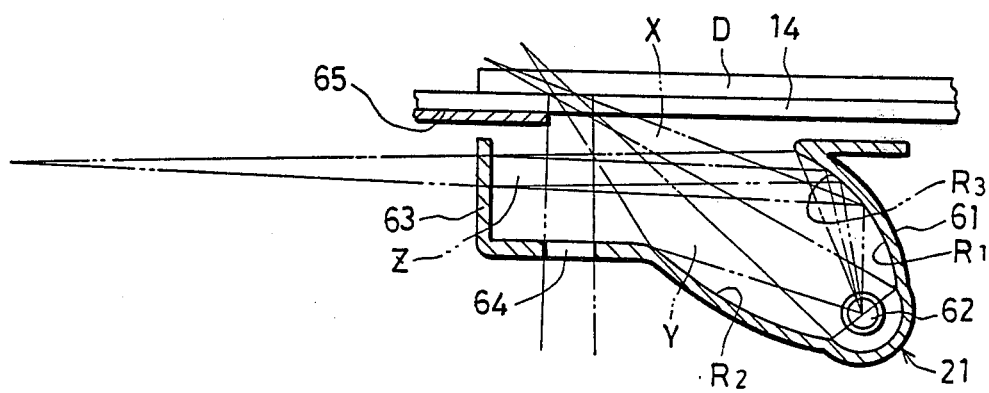
FIG. 2 is the vertical sectional view of the original illuminating device related to the present invention.

FIG. 1 is the perspective view denoting one of the preferred embodiments of the original illuminating device related to the present invention. FIG. 2 is the vertical sectional view of the original illuminating unit shown in FIG. 1 for explaining its operation.

The original illuminating device related to the present invention is provided with a condenser mirror 61, a halogen lamp 62 which is substantially the illuminant, and a mirror 63. The condenser mirror 61 is concave-shaped, while the halogen lamp 62 is secured to the inner bosom of the concaved condenser mirror 61. Light X reflected from the first area (see R1 shown in FIG. 2) of the condenser mirror 61 and light Y reflected from the second area (see R2 shown in FIG. 2) of the same mirror 61 respectively radiate the illumination-designated area of the original D through the contact glass 14, whereas light Z reflected from the third area (see R3 shown in FIG. 2) of the condenser mirror 61 radiates itself in parallel with the contact glass 14, although beams rather tend to be focused in strict sense. The mirror 63 is vertically installed to the position against which the light Z is illuminated. The mirror 62 further focuses the slightly focused light Z before leading it to the third area R3 of condenser mirror 61 so that light can be focused to the halogen lamp 62. Since the tubular glass of the halogen lamp 62 is not perfectly mirror-finished, the light Z focused onto the halogen lamp 62 irregularly reflects when being hit against the tubular glass of this halogen lamp 62, thus causing the reflected light that should have followed the same light path as those of light X and Y to be illuminated against the original D through the contact glass 14. In other words, the original illuminating device embodied in the present invention causes light from the third area R3 which has little to do with the illumination of the original D to irregularly reflect by the tubular glass of the halogen lamp 62 in conjunction with the incident angle before eventually illuminating the original D by allowing the irregularly reflected light to pass through the first and second areas R1 and R2. As a result, the copying system can significantly improve the utility efficiency of light from the halogen lamp 62.

Another preferred embodiment of the original illuminating device related to the present invention allows light from the halogen lamp 62 to directly illuminate the original D placed on the contact glass 14. Slit 64 is provided between the condenser mirror 61 and mirror 63 for constraining the passing range of light reflected from the original D.

According to the result of measuring light volume on the original D while operating the original illuminating device in conjunction with the above preferred embodiment, although the mirror 63 was not used for directly illuminating the original D, compared to the case of illuminating the original D using only the condenser mirror 61 (where no light reflected from the blackened surface mirror 63), light volume proved to have increased by about 15%.

Since the original illuminating device related to the present invention illuminates the original D placed on the contact glass 14 by applying only the direct light from the halogen lamp 62 and light reflected from the first and second areas R1 and R2 of the condenser mirror 61, light radiating the illumination-needed portion cannot be shut off by the white reflection part 65 being present below the bottom surface of the contact glass 14. As a result, the unique constitution of the original illuminating device related to the present invention can perfectly prevent tip-shadow from taking place at the tip part of the copied paper P.

It should be understood that the present invention is not limitative of those preferred embodiments described above. For example, the original illuminating device related to the present invention may use a curved surface reflection mirror having a specific curved rate capable of focusing light Z onto the halogen lamp 62 in place of using the plane surface mirror 63. The original illuminating device related to the present invention may also use any illuminant other than the halogen lamp. Furthermore, the preferred embodiments of the original illuminating device can implement a variety of changes and modifications of design within the spirit and scope of the present invention.

In particular, the original illuminating device embodied by the present invention securely prevents tip-shadow from taking place at the tip portion of the copied paper by effectively radiating light against the original placed on the contact glass from only one direction. Furthermore, since the system allows light from the condenser mirror to be again focused onto the illuminant by applying mirror without illuminating the original, substantial volume of light radiated on the original can securely be increased.

What is claimed is:

1. A device for illuminating an original document on an electrophotographic copying machine and to prevent a tip shadow on a copy obtained from the machine, said device comprising a contact glass for supporting an original document, an illuminant, a condenser mirror, and a second mirror which is opposite from and faces toward said condenser mirror, said condenser mirror being provided with a shape capable of guiding a majority of light from said illuminant onto an original document which is placed on said contact glass, said second mirror facing said condenser mirror being located in a path of light from the illuminant and condenser mirror but being displaced from direct paths of light which extend from the illuminant and condenser mirror to the original document, said condenser mirror having a shape and orientation capable of reflecting light back to said illuminant.

2. The original illuminating device of an electrophotographic copying machine in accordance with claim 1, in which said illuminant has a configuration that causes incident light from the second mirror to be irregularly reflected.

3. The original illuminating device of an electrophotographic copying machine in accordance with claim 1, in which said second mirror facing said condenser mirror is provided with a plane surface.

4. The original illuminating device of an electrophotographic copying machine in accordance with claim 1, in which said second mirror facing said condenser mirror is provided with a concave surface.

5. The original illuminating device of an electrophotographic copying machine in accordance with claim 1, in which said condenser mirror and the second mirror which is opposite from it are integrally formed, and slit means positioned between these mirrors for constraining a passable range of light reflected from the original document.

* * * * *